Feb. 16, 1965  G. M. RAPATA  3,169,439
PLASTIC FASTENER HAVING WEB-LIKE REINFORCING MEANS
Filed Dec. 28, 1961  2 Sheets-Sheet 1
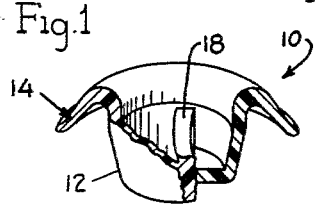
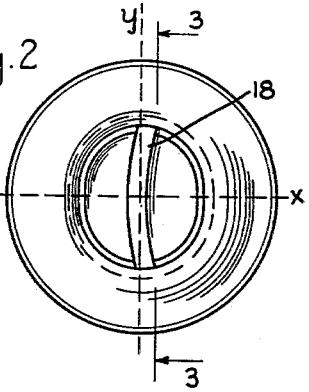
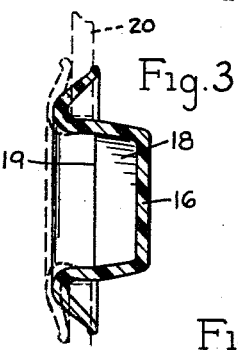
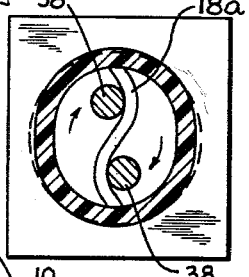
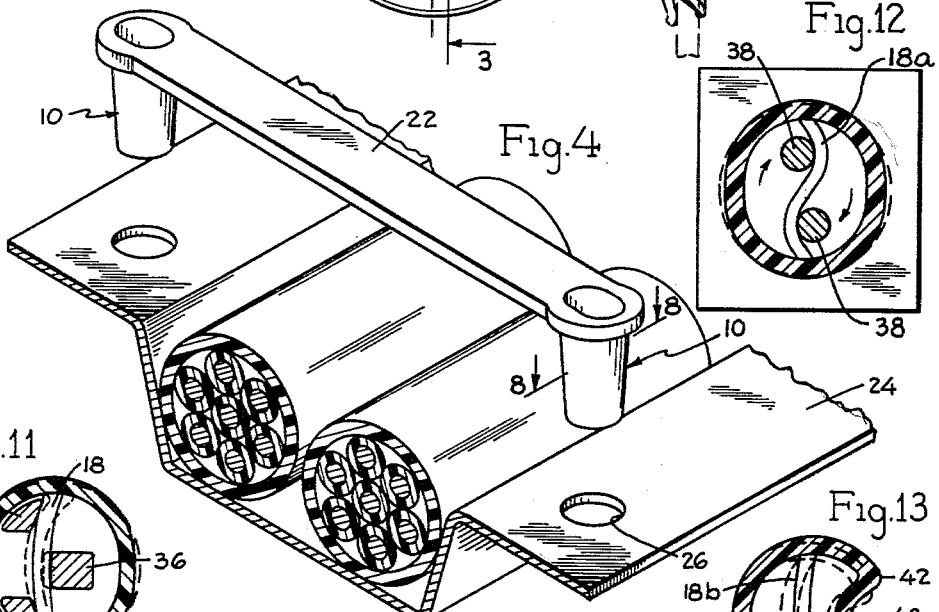
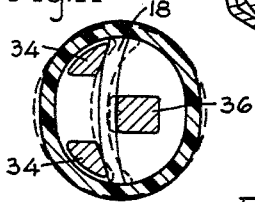
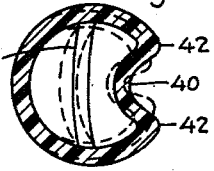
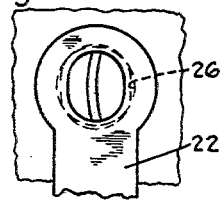
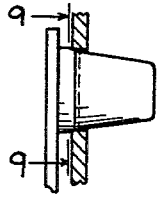
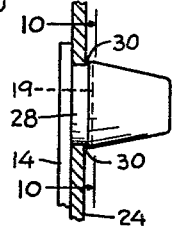
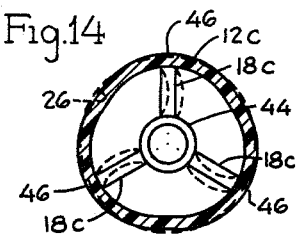
INVENTOR.
George M. Rapata
BY
ATT'Y

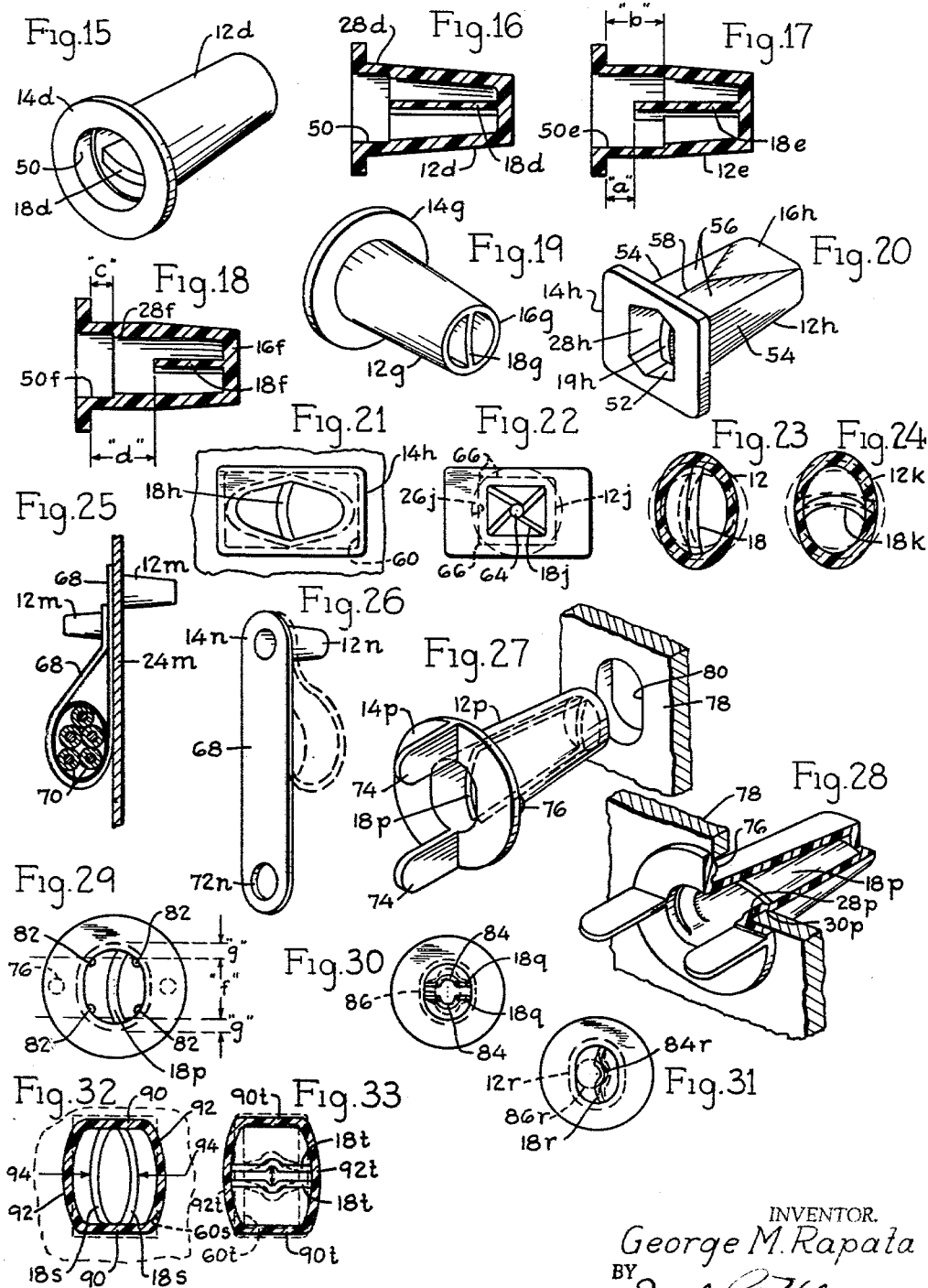

United States Patent Office 3,169,439
Patented Feb. 16, 1965

3,169,439
PLASTIC FASTENER HAVING WEB-LIKE
REINFORCING MEANS
George M. Rapata, Park Ridge, Ill., assignor to Illinois
Tool Works Inc., Chicago, Ill., a corporation of
Delaware
Filed Dec. 28, 1961, Ser. No. 162,803
12 Claims. (Cl. 85—5)

This invention relates to a fastener. More particularly, it relates to a one piece deformable plastic fastener. In the fastening art the predominant fasteners of the past century have been metallic in nature and have either been screw threaded fasteners or sheet metal fasteners. In recent years the use of plastic materials for fasteners has been increasing because of the versatility and complex shapes that it is possible to mold or form. In addition, the plastic materials have certain physical characteristics which are not to be found in the metal field.

A common problem encountered with metal fasteners is in sealing the aperture through which the metallic fastener is telescoped. Secondarily, certain metallic fasteners are usable only once since the material of the fastener is deformed beyond its elastic limit on mounting and/or when removal is attempted. Hence the fastener is not re-usable. In overcoming both of these failings of metallic fasteners, the plastic fastener is ideally suited because of the nature of the materials involved and the broad application of techniques available to the designer.

An object of this invention is to provide a simple, one piece plastic fastener for attachment to a complementary apertured workpiece.

Another object of the invention is to provide an economical plastic fastener capable of sealing the aperture of a workpiece with which it is associated. A further object is to provide a fastener which can be re-used a great number of times and which can be economically fabricated using a minimum amount of material.

Still other objects will become apparent to those skilled in the art when the specification is read in conjunction with the accompanying drawing wherein:

FIG. 1 is a perspective view in partial section of an embodiment of the present invention;

FIG. 2 is a plan view of the device shown in FIG. 1;

FIG. 3 is a sectional elevation taken along line 3—3 of FIG. 2;

FIG. 4 is a perspective view of a second embodiment of the present invention utilized in multiple form for purposes of securing a plurality of cables in a channeled member;

FIG. 5 is a plan view of one end of the device shown in FIG. 4 prior to its insertion in the apertured workpiece;

FIG. 6 is a partial elevation showing the device of FIG. 4 at an intermediate step during its insertion in the apertured workpiece;

FIG. 7 is an elevational showing of this embodiment in the final installed position;

FIG. 8 is a sectional view taken along line 8—8 of FIG. 4;

FIG. 9 is a sectional view taken along line 9—9 showing the configuration of the body portion during insertion in a circular apertured workpiece;

FIG. 10 is a sectional view taken along line 10—10 of FIG. 7 with the section being taken substantially in the same plane of the body portion as the view in FIG. 9;

FIG. 11 is a transverse section of a device of the type previously shown showing the utilization of tool means for distortion of the fastener;

FIG. 12 is a further embodiment of the present invention showing a modification in the transverse reinforcing means as well as showing a sectional view of the prongs of a tool for applying same;

FIGS. 13 and 14 disclose transverse sections of modifications to the stud portion heretofore shown;

FIGS. 15 through 18 are further embodiments of the invention showing varying axial lengths of the transverse reinforcing web combined with varying wall thicknesses in the fasteners;

FIG. 19 illustrates a fastener having both ends open;

FIGS. 20 and 21 are a perspective and plan view respectively of a device contemplated by the present invention and being a modification to those heretofore shown;

FIG. 22 is still another modification of the reinforcing web structure;

FIGS. 23 and 24 relate to the disposition of the web relative to the transverse axes of the fastener;

FIGS. 25 and 26 are illustrations of the use of this particular stud or body portion when utilized as attaching means for single and double studded cable straps;

FIGS. 27–29 show the use of an embodiment of this invention as a quarter turn fastener;

FIGS. 30 and 31 show two modifications to the present invention utilized as screw retaining members;

FIGS. 32–33 disclose still other embodiments of the invention suitable for use in rectangular apertures.

A fastener 10 embodying hte principles taught by the present invention includes a tubular body or stud portion 12 having a laterally extending head portion 14 at one end of the stud portion. The stud portion 12 preferably has a substantially uniform wall thickness throughout its axial extent, though this is not essential. Further, the stud portion 12 is preferably provided with an uninterrupted smooth exterior surface tapered inwardly a portion of its axial extent to facilitate entry into an apertured panel. In the embodiment shown in FIGS. 1 and 3, the end 16 of the stud 12 opposite the head is closed. The stud 12 is generally of oval configuration having a minor axis "x" and a major axis "y" when viewed in transverse section perpendicular to the axis of the fastener.

A transverse reinforcing means or web 18 oriented axially with respect to the stud axis extends integrally between opposite wall portions of the stud. It extends from adjacent the entering end 16 to a point spaced from the juncture of the head and the stud, for purposes best set forth hereinafter. In the present instance, web 18 is slightly arcuate in section and integrally joins the opposite internal wall portions substantially in the region of their intersection by the major axis "y." In this embodiment the head 14 includes an outwardly and downwardly extending flange. It is resilient in nature, tapering from its juncture with the head to its peripheral extremities where it is provided with a slight bead for strength and sealing purposes. It is adapted to be fixed upwardly when associated with a panel.

The arcuate nature of web 18 permits the web, while reinforcing opposite wall sections in the stud 12, to be bent or flexed intermediate its lateral extremities. Upon insertion of fastener 10 into the aperture of a workpiece 20 (shown in phantom in FIG. 3 for purposes of clarity and illustration, with the inserted shape of the fastener also being in phantom), the web is temporarily flexed during insertion and will then return to its initial position. The fastener is preferably utilized with a workpiece having a noncomplementary shaped aperture with at least one dimension of the aperture being less than the dimension of the fastener along the transverse major axis "y" for purposes described hereinafter.

In FIG. 4 there is illustrated a device having the same basic stud configuration as FIGS. 1 through 3. The fastener 10 is provided in duplicate with a joining strap portion 22, with the duplicate fastener 10 at opposite ends extending in the same direction and adapted to secure a plurality of cables or similar devices in a channeled workpiece 24. Referring now to FIGS. 5 through 10, we can best see the novel stud portion of the fastener taught by this invention. FIG 5 shows a plan view similar to FIG. 2 with the addition of the strap 22 wherein the fastener is generally an oval in configuration, having a major and minor axis, adapted to be associated with a non-complementary circular aperture 26 of the type shown in channeled workpiece No. 24. FIGS. 6 and 7 show a fastener as it is being inserted in the apertured workpiece and in final fastened position, respectively.

FIG. 8 is a section along line 8—8 of FIG. 4 showing the stud portion 12 in its initial molded position. FIG. 9 shows how the web 18 is distored to a smaller radius of curvature with the distance between its opposite lateral extremities being foreshortened while the wall of stud 12 distends along its minor axis to accommodate the part within the circular aperture. As the fastener is telescoped within an apertured workpiece, web 18 remains distored until its upper extremity 19 has passed beyond the opposite side of workpiece 24 whence it substantially returns to its initial position as shown in FIG. 10. The wall portion 28 intermediate the upper extremity 19 of the web and the juncture of the stud with the head is deformed inwardly at points along the major axis of the oval so as to form shoulder means 30 adapted to engage the panel in opposition to the head 14. Removal of the fastener is accomplished by the deformation of the web by axial movement of the fastener or by secondary means described hereinbelow.

Fasteners of the type just disclosed, as well as those to be described hereinafter, can be manufactured by injection molding of materials of the types commonly known as polyethylene, polypropylene, or nylon. Other forms of material will be apparent to those skilled in the art and there is no intent to limit the invention to a specific form of plastic material. Any type of plastic material which is semi-rigid in nature, but has properties of limited resiliency and is capable of attempting to return to its initial form after distortion will be totally satisfactory.

In certain applications it may not be desirable to rely upon the resiliency of the material alone during removal. To assist in the removal and occasionally in application of a fastener of this type, it has been found possible to utilize a tool, of the pliers type, not shown, having a nose portion which in transverse section is best seen in FIG. 11. A pair of spaced prongs 34 are positioned on the convex side of the arcuate web 18 adjacent its outer extremity where it joins the wall of stud 12, and a single prong 36 of the tool is positioned centrally on the opposite or concave side of the web 18. Squeezing of the pliers results in a movement of prong 36 into the cavity between spaced prongs 34. This results in a foreshortening and bending of the web 18 to the position shown in phantom. The major axis of the oval shape of the fastener is foreshortened while the minor axis is distended whereby the stud portion assumes a generally circular shape which is readily accepted through a complementary circular aperture in a workpiece. Release or movement of the prongs 34 and 36 away from each other permits the web 18 to assume its initial position. The strength of shoulder 30 formed in the intermediate wall portion 28 can be controlled by the stiffness of web 18. When said web 18 is substantially rigid, then the use of a secondary tool means is desirable to assist in the bending of the web.

In the previous embodiment the web 18 was generally arcuate in configuration. In the embodiment shown in FIG. 12, the web 18a is substantially sinusoidal in transverse section and is adapted to be foreshortened either by flexure during insertion in the workpiece, or through the use of a spanner type tool 38 wherein the tool 38 is rotated relative to the fastener and the sinusoidal web 18a foreshortened to permit ease in insertion or removal. While all of the embodiments disclosed thus far can be readily inserted in the workpiece, the heavier varieties will generally require a mechanical distortion of the web to permit removal.

In the embodiments discussed above, the walls of the stud portion were arranged in an oval configuration. The embodiment of FIG. 13 discloses a generally circular walled stud having an integral waved portion on the right side, as seen in the figure, providing a relief or groove 40. The convex side of the groove 40 faces the concave side of web 18b. An axially tapered shank, as previously described, permits a stud having a cross section of this type to collapse circumferentially with the points 42 drawing inwardly and the web 18b flexing to the positions shown in phantom so as to be acceptable by telescopic association of the part with a circular aperture of smaller diameter. When the upper extremity of the web passes beyond the undersurface of the panel, the tips 42 would thence open outwardly to their initial position resulting in a distortion of the intermediate wall portion as explained hereinabove to provide shoulder means for engagement with a panel.

The device shown in FIG. 14 is provided with a plurality of webs 18c emanating substantially radially from circumferentially spaced nodular wall portions and joined in the center of the fastener by suitable means, such as tube 44. In this embodiment the stud 12c is non-circular, but is adapted for use in a circular aperture 26 of the general size shown in phantom. The individual webs 18c would flex inwardly as shown in phantom so that the three nodes 46 would move radially inwardly with a general flexure of the circumferentially spaced wall portions between nodes 46 and thence, after passing through the aperture, the webs 18c would spring outwardly and permit the wall portion of nodes 46 axially displaced above the web 18c to distort inwardly to underlie the panel in shoulder forming fashion similar to that described heretofore. Tube 44 can, it desired, be adapted to axially accept a secondary stud element, such as as a screw.

The stud portion of embodiments shown in FIGS. 15 through 18 have walls which are modified from the previously disclosed embodiments in that the wall is counterbored adjacent the head end as at 50. The embodiment shown in FIGS. 15 and 16 have an upper oval stud 12d, a laterally extending head 14d and an arcuate transverse web 18d. In some of the larger forms of fasteners, the wall thickness becomes too rigid and hence the counterbore 50 makes collapsing easier when the intermediate wall portion 28d is deformed inwardly to engage a plurality of panels. For example, in FIG. 17 the counterbored portion 50e extends inwardly beyond the free extremity of web 18e. This permits the fastener to accept a panel having a thickness "a" as indicated by the arrows as well as a panel when combined with thickness "a" having a total dimension "b" as indicated by the arrows. The fastener modification as shown in FIG. 18 is basically the converse of FIG. 17 in that it utilizes the technique of the counterbore 50f producing a reduced wall thickness having a dimension "c" while the web 18f is axially spaced from the counterbore by an amount sufficient to provide a cumulative multiple panel gripping range "d" as indicated by the arrows.

It has been found in some instances that where sealing is not an absolute necessity, the end 16f can be removed and a fastener having both ends of the stud portion opened, such as shown in FIG. 19, is equally suitable for the purpose intended. The web 18g and stud 12g are generally more flexible under these conditions since they do not have the added transverse support of a closure at their entering end 16g. Such a fastener besides being acceptable for ready retention in a panel, can be utilized as a pass-through grommet for insulating electrical wiring and other means from the panel through which it passes. Similarly, the web 18g will secondarily serve as a divider to the elements introduced axially within the fastener.

Up to this point applicant has discussed generally oval or cylindrical forms. The invention is equally applicable to fasteners having studs which are polygonal or diamond shaped in transverse section. The device shown in FIG. 20 has a bore 52 which is generally hexagonal in shape with an external entering end 16h generally rectangular in shape which develops into an irregular hexagon adjacent the head. The stud 12h on its external walls is provided with a pair of opposed flat sides 54 and on adjoining sides blending tapered portions 56 provide a line of juncture 58. This fastener is adapted to be inserted in a generally rectangular aperture 60, shown in phantom in FIG. 21. As can be best seen in FIG. 21, web 18h flexes and the flat sides 54 of stud 12h distend outwardly to a semicylindrical configuration during insertion in the aperture. When the upper extremity 19h of web 18h has passed through the plane coincident with the surface of the panel 24h opposite the surface engageable by the head 14h, it will return to its initial position. This permits distortion of the intermediate wall portion 28h radially inwardly at two opposed points along line of juncture 58. Thus, a sharp engaging shoulder is formed on opposite sides of the fastener when web 18h returns to its initial position.

A further modification to the present invention is shown in FIG. 22 wherein a generally square shank 12j has a plurality of webs 18j extending tangentially to their juncture with a central portion 64. The corners 66 after initial distortion during insertion will spring out by action of webs 18j and underlie the workpiece adjacent aperture 26j, shown in phantom, to retain the fastener to the panel.

In the preferred embodiment the web 18 is transversely disposed generally along the major axis of an oval. As shown in FIG. 23, when the web 18 is distorted so that the walls will assume a generally circular configuration, the web is under compressive forces. The invention is not restricted to having the web disposed in any particular relationship. For example, as seen in FIG. 24, it is totally feasible to have the web disposed generally along the minor axis of the oval. In this instance the web 18k would be stretched when the fastener is distorted and hence would be under tension. Other dispositions of the web relative to the transverse axes of the stud portion have been shown and will be apparent to those skilled in the art.

Two examples of the use of a fastener of this type are shown in FIGS. 25 and 26. In FIG. 25 two studs 12m are disposed in opposite directions and supported by an intervening strap 68 which continues beyond one of said studs and is provided at its extremity with an aperture. The lower stud 12m is telescoped with an aperture in workpiece 24m while the strap 68 is reversely bent over a plurality of cables 70 and the aperture in the strap extremity telescopically associated with the second stud 12m. This particular form is most desirable where the cable strap is initially assembled with the workpanel and then wrapped around the cable 70 to retain in applied position.

In other instances, it is more desirable to preassemble the cables together and to secure them as a unit to the workpiece. Such a device is shown in FIG. 26 wherein a stud 12n has a head 14n having a lateral extension or strap 68n with an aperture 72 at its extremity opposite to the stud 12n. Strap 68 can be reversely bent so that aperture 72 may be telescopically associated with stud 12n prior to the insertion of 12n within the workpiece. While all of the stud forms mentioned heretofore would be suitable, this would be one example of where an embodiment of the type shown in FIGS. 17 or 18 could be most satisfactorily utilized, the counterbore 50f forming means to secure aperture 72 in preassembled position while web 18f and the intervening wall means 28f would serve to secure the preassembly to the apertured workpiece.

In each of the previous embodiments a fastener has been utilized with a non-complementary workpiece. The modified embodiment shown in FIGS. 27 through 29 utilizes stud 12p having a tapering oval configuration in transverse section with a flat head 14p at one end thereof. It is similarly provided with a transverse web 18p for reinforcing purposes. In this instance the fastener is provided with a pair of finger engaging means 74 extending upwardly from the head 14p and a pair of oppositely disposed protuberance means 76 extending downwardly from the head and positioned along the minor axis of the oval configuration. The workpiece 78 is provided with an oval aperture 80 complementary to the oval configuration of the stud 12p at the point at which it joins head 14p. As seen in FIG. 28, telescopic association of the fastener with the complementary aperture 80 followed by a rotation of 90 degrees results in a deformation of the intermediate wall portion 28p to form shoulder means 30p to retain the fastener in mounted relationship to panel 78. In this figure panel 78 and aperture 80 are shown in phantom for purposes of clarity in illustration. As the fastener is rotated a quarter of a turn, the protuberance 76 will drop into the unoccupied portion of oval aperture 80 along its major axis and thereby prevent unintentional retrograde movement of the fastener. In this particular embodiment the web 18p serves mainly as a reinforcing means and does not flex. A modification to this embodiment can be seen in FIG. 29 wherein a plurality of axially extending ribs 82 are provided along the internal wall of the stud and are spaced apart in a direction along the major axis a distance substantially equal to the minor axis of the oval aperture 80, shown by the measurement "$f$." These reinforcing ribs 82 serve primarily as reinforcing means to define the limits of distortion of the intermediate wall portion 28p, as the stud is rotated with the amount of retention shown as measurement "$g$."

As was previously shown in FIG. 14, the embodiments incorporating the principals of this invention are capable of axially accepting secondary elements. In FIG. 30 we have another such device. A pair of opposed substantially parallel web means 18q extend in spaced relationship along the minor axis of the fastener. Intermediate their lateral extremities there is provided a concave groove section 84 with the concavity of each section 84 facing its opposite number. A fastener of this type when disposed within a circular hole would tend to place the webs 18q under tension as previously shown in FIG. 24 and the central portions 84, during insertion of the fastener, would tend to flatten out. Secondary stud means, such as a screw 86 shown in phantom, inserted in the concavity formed by portions 84 would spread the webs 18q outwardly. This would tend to foreshorten the distance between opposed walls of the stud, as measured on the minor axis, and would elongate the major axis thereby increasing the retentive powers of the formed shoulders of a type previously described.

A similar device employing a single web 18r is shown in FIG. 31. This web 18r is generally disposed along the major axis and has an intermediate portion 84r forming a concavity facing one wall of the fastener disposed on the minor axis. Insertion of a secondary stud means 86r, as shown in phantom section, would force the web 18r to the right, as viewed in the drawing, and would tend to elongate it, thereby increasing the transverse dimension of the stud 12r along its major axis. This would insure greater retention and secondarily would provide for the retention of a secondary member.

The last two modifications of the present invention are shown in FIGS. 32 and 33. The sections through the stud portion indicate devices having two opposed flat walls 90 while the intermediate and opposite two walls 92 are generally arcuate in section with the convex side extending outwardly beyond the lateral extremities of walls 90. The webs 18s of FIG. 32 are concave in the direction toward each other. Application of a squeezing force in the direction of the arrows 94, by a suitable tool not shown, would place the webs 18s in tension and would draw the sides 92 into a substantially straight lined relationship as a result of the movement of walls 90 in opposite directions. The fastener could then be placed into a rectangular hole 60s of the type shown in phantom, and upon release of the pressures along arrows 94 on web 18s would result in a return of walls 92 to their initial configuration so as to distort an intermediate wall portion 28s, not shown, to form oppositely disposed shoulders for purposes of engagement with the underside of the panel.

A similar device is shown in FIG. 33 wherein the webs 18t are disposed and extend in an initially substantially parallel relation between opposite curved walls 92t. The spreading apart of webs 18t and the resultant compressive forces on said webs 18t would draw the walls 92t inwardly to permit their association with a rectangular aperture in the workpiece.

Thus, applicant has disclosed a one piece plastic fastening device having a tubular or sack-like body or stud portion which can be open at one or both ends. The tubular stud portion has reinforcing means extending between opposite or circumferentially spaced portions of its internal wall. These reinforcing means terminate short of the head end of the fastener to provide an intermediate wall portion which can be distorted inwardly to form shoulder means when the fastener is associated with a non-complementary aperture or with an aperture having the same configuration but of a smaller dimension.

It will be appreciated that various head styles can be incorporated in a fastener of this type, there being four disclosures of different types of heads, but applicant does not desire to be limited to a specific head form.

All of the devices contemplated can be economically fabricated from a variety of plastic materials to produce a fastener suitable for retaining a plurality of panels together or, in the alternative, securing secondary means adjacent the work panel.

Other modifications to the invention will be apparent to those skilled in the art and it is my intent to be limited only by the appended claims.

I claim:

1. A one piece plastic fastener including a body portion and a head portion extending laterally outwardly from one end of said body portion, said body portion being of generally tubular configuration throughout a major portion of its length, a plurality of reinforcing imperforate wall means of substantial axial extent extending axially within said body portion and integral with the internal wall of said body portion, said imperforate wall means being joined together substantially on the axis of the fastener as a whole and extending substantially to the end of the body portion remote from said head portion, the upper extremity of said wall means terminating in spaced relation from the juncture of the head with said body so that when said body portion is inserted in a non-complementary shaped aperture in a workpiece, said reinforcing means are first distorted and thence returned to their initial position after said upper extremity has passed beyond the surface of the workpiece opposite to the surface engaged by said head portion, the intervening section of the body portion intermediate the reinforcing means and juncture of the body with the head being deflected inwardly to form shoulder means cooperative with said head to retain the fastener in mounted position on the apertured workpiece.

2. A fastener comprising a one piece plastic device adapted to be accepted within a substantially circular hole in a complementary plate-like workpiece, said fastener including a body portion and a head portion extending radially outwardly from one end of said body portion, said body portion including a generally tubular element tapering inwardly in the direction of a terminal end opposite to the head, the wall of said tubular portion being substantially uniform in thickness throughout the major portion of its axial extent and being initially substantially substantially smooth and uninterrupted on its external surface, reinforcing means extending transversely between internal wall surfaces of said body portion, said body portion in transverse section being initially substantially oval in configuration having major and minor axes with the major axis being greater than and the minor axis being equal to or less than the diameter of the hole in the workpiece, said reinforcing means being a web of substantial thickness generally arcuate in transverse section and having its lateral terminal edges integral with the wall of the body portion at opposite points disposed generally on or immediately adjacent the major axis of the oval forming said body portion and extending axially within said body portion from its terminal end to a point spaced from said head, whereby when said oval body portion of the fastener is applied through the substantially circular hole in the workpiece, said reinforcing means will distort while passing through said hole and will return substantially to its initial position after the extremity of said reinforcing means has passed the undersurface of the workpiece, the wall portions intermediate the upper extremity of the reinforcing means and the head being distorted inwardly along the major axis of the oval to form shoulder means for engaging the undersurface of the panel opposite the surface engageable by the head.

3. A device of the type claimed in claim 2 including means at the terminal end of said body portion opposite to said head for closing and sealing said terminal end.

4. A fastener comprising a one piece plastic device adapted to be accepted within a substantially circular hole in a complementary plate-like workpiece, said fastener including a body portion and a head portion extending radially outwardly from one end of said body portion, said body portion including a generally tubular element tapering inwardly in the direction of its terminal end opposite to the head, the wall of said tubular portion being substantially uniform in thickness throughout a major portion of its axial extent and being initially substantially smooth and uninterrupted on its external surface, reinforcing means extending transversely between internal wall surfaces of said body portion, and reinforcing means including a pair of web-like members spaced from one another and extending axially within said body portion, each of said web-members having a central transversely arcuate portions with the concave side thereof facing the concavity in the opposite web, said mutual concavities forming a passageway for the acceptance of a secondary complementary stud element, said body portion in transverse section being initially substantially oval in configuration having major and minor axes with the major axis being greater than and the minor axis being equal to or less than the diameter of said substantially circular hole in the workpiece, said reinforcing means extending axially within said body portion from its terminal end to a point spaced from said head, whereby when said oval body portion of the fastener is applied through the hole in the workpiece, said reinforcing means will distort while passing through said hole and will return substantially to its initial position after the extremity of said reinforcing means has passed the undersurface of the workpiece, the wall portions intermediate the extremity of the reinforcing means and the head being distorted inwardly along the major axis of the oval to form shoulder means for engaging the undersurface of the panel opposite the surface engageable by the head.

5. A fastener comprising a onepiece plastic device adapted to be accepted within a substantially circular hole in a complementary plate-like workpiece, said fastener including a body portion and a head portion extending radially outwardly from one end of said body portion, said body portion including a generally tubular element tapering inwardly in the direction of its terminal end opposite to the head, the wall of said tubular head portion being substantially uniform in thickness throughout a major portion of its axial extent and being initially substantially smooth and uninterrupted on its external surface, reinforcing means extending transversely between internal wall surface of said body portion, said reinforcing means including a web having two sections extending angularly outwardly from opposite portions of the internal wall of said body portion and joined by a central portion which in transverse section has the shape of a segment of arc, said segment with its concave side in cooperation with the opposed wall portion of said body portion being adapted to accept a secondary complementary stud element axially within said fastener, said body portion in transverse section being initially substantially oval in configuration having major and minor axes with the major axis being greater than and the minor axis being equal to or less than the diameter of the circular hole in the workpiece, said reinforcing means extending axially within said body portion from its terminal end to a point spaced from said head, whereby when said oval body portion of the fastener is applied through the circular hole in the workpiece said reinforcing means will distort while passing through said hole and will return substantially to its initial after the extremity of said reinforcing means has passed the undersurface of the workpiece, the wall portions intermediate the extremity of the reinforcing means and the head being distorted inwardly along the major axis of the oval to form shoulder means for engaging the undersurface of the panel opposite the surface engageable by the head.

6. A one piece plastic fastener adapted to be accepted in a non-complementary aperture in a complementary workpiece, said fastener including a stud portion and a head extending radially outwardly from said stud portion, said stud portion being generally tubular in nature and having a continuous wall substantially uniform in thickness throughout its extent, said continuous wall being provided with two opposite flat sides joined by two opposed arcuate sides, reinforcing web means including a pair of arcuate webs with their concavities facing one another and extending axially for a substantial distance within said stud portion, said webs attached at their lateral edges to the internal surfaces of the opposed flat side walls of said stud portion, said web means terminating at a point spaced from the head end of said stud portion, said fastener being adapted to be accepted in a rectangular aperture in said workpiece, application of pressure to the convex side of the opposed web means being adapted to move the opposed flat sides in opposite directions thereby elongating to a substantially linear form the arcuate sides, while release of pressure on the web means after insertion of the stud portion in the workpiece results in a radially outward movement of the arcuate sides with distortion of the wall to form shoulder means for retention of the fastener in the workpiece.

7. A one piece plastic fastener adapted to be accepted in a non-complementary aperture in a complementary workpiece, said fastener including a stud portion and a head extending radially outwardly from said stud portion, said stud portion being generally tubular in nature and having a continuous wall substantially uniform in thickness throughout its extent, said stud portion including two opposed flat sides and two opposed intermediate arcuate sides with the convex sides of the arcuate sides projecting outwardly, reinforcing web means extending axially for a substantial distance within said stud portion and terminating at a point spaced from the head end of the stud portion, said web means including a pair of web like members extending axially within the stud portion and integral with the opposed arcuate sides, said web-like members spaced radially from one another and each having a centrally disposed axially extending transversely curved portion with the concavity of each curved portion facing the other curved portion and adapted to accept tool means therebetween for spreading said web elements apart to foreshorten their juncture with the arcuate wall sides whereby said arcuate wall sides are drawn radially inwardly to a substantially linear form to assist in the insertion of the fastener in the hole of the workpiece whereby release of the tool means results in a return of the arcuate portions of the stud to their initial position with a resulting formation of shoulder means on the external surface of said arcuate portions for retention of the fastener in the workpiece.

8. A fastener comprising a one piece plastic device adapted to be accepted within a hole in a complementary plate-like workpiece, said fastener including a body portion and a head portion extending radially outwardly from one end of said body portion, said body portion including a generally tubular portion tapering inwardly in the direction of the terminal end opposite to the head, the wall of said tubular portion being substantially uniform in thickness throughout a major portion of its axial extent and being initially substantially smooth and uninterrupted on its external surface, reinforcing means extending transversely between internal wall surfaces of said body portion, said body portion in transverse section being initially non-circular in configuration and having major and minor axes with the major axis being greater than and the minor axis being equal to or less than the transverse measurement of the hole in the workpiece, said reinforcing means extending axially within said body portions from its terminal end to a point spaced from said head, said reinforcing means including a web of substantial thickness being generally arcuate in transverse section and having its lateral terminal edges integral with the wall of the body portion at opposite points disposed generally on or immediately adjacent said major axis, whereby when said body portion of the fastener is applied through the hole in the workpiece said reinforcing means will distort while passing through said hole and will return substantially to its initial position after the extremity of said reinforcing member has passed the undersurface of the workpiece, the wall portions intermediate the extremity of the reinforcing means and the head being distorted inwardly along said major axis to form external shoulder means which engage the undersurface for retaining the fastener in mounted position.

9. A one piece plastic quarter turn fastener adapted to be accepted within an oval hole having a major and minor axis in a workpiece, said fastener including a tubular body portion and a head portion extending radially outwardly from one end of said body portion, said body portion tapering from its juncture with the head to its opposite end, said body at its head end being oval in transverse section having major and minor axes with the minor axis being substantially identical in size to the minor axis of the oval hole in the workpiece, axially disposed web means extending between and integral with opposite wall portions of the body portion and having its lateral extremities positioned adjacent the major axis of the oval of said body portion, said web having substantial thickness and forming an imperforate wall generally arcuate in transverse section and extending axially within said body portion from adjacent the end opposite said head to a point spaced from said head with said spacing being substantially equal to or greater than the thickness of said workpiece whereby when said fastener is telescopically associated with said oval hole and rotated 90 degrees the wall portion intermediate the extremity of said web adjacent said head and the head will deform radially inwardly to form shoulder means to retain the fastener in the workpiece.

10. A device of the type claimed in claim 9 wherein four ribs are provided on the inner surface of said wall of the body portion with two ribs positioned on each side of said web substantially in quadrature.

11. A device of the type claimed in claim 9 wherein said head on its side opposite the body portion has means for manual engagement to facilitate rotation of said fastener.

12. A device of the type claimed in claim 9 wherein a pair of protuberances are provided on said head and positioned on opposite sides relative to said body portion, said protuberances extending downwardly from said head on the same direction as said body portion and being positioned in quadrature relative to the disposition of said web whereby when said fastener is rotated and said shoulder means are formed along the major axis of the oval body portion said protuberances will snap into the intervening open area of said hole along the major axis thereof to prevent retrograde movement of said fastener.

References Cited in the file of this patent

UNITED STATES PATENTS

| | | |
|---|---|---|
| 2,402,925 | Spooner | June 25, 1946 |
| 2,426,326 | Tooms | Aug. 26, 1947 |
| 2,862,267 | Parkin | Dec. 2, 1958 |
| 2,896,889 | Hershberger et al. | July 28, 1959 |
| 2,909,957 | Rapata | Oct. 27, 1959 |
| 2,974,916 | Richey | Mar. 14, 1961 |

FOREIGN PATENTS

| | | |
|---|---|---|
| 659,939 | Germany | May 17, 1938 |
| 1,208,746 | France | Sept. 14, 1959 |